US012754561B2

(12) United States Patent
Aizawa et al.

(10) Patent No.: US 12,754,561 B2
(45) Date of Patent: Oct. 6, 2026

(54) MOBILE BODY, CONTROL DEVICE AND CONTROL METHOD THEREFOR, AND STORAGE MEDIUM

(71) Applicant: HONDA MOTOR CO., LTD., Tokyo (JP)

(72) Inventors: Koki Aizawa, Wako (JP); Yunosuke Kuramitsu, Wako (JP); Ryo Iwatani, Wako (JP); Taichi Nakamura, Wako (JP); Hideki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 2 days.

(21) Appl. No.: 19/046,989

(22) Filed: Feb. 6, 2025

(65) Prior Publication Data

US 2025/0306597 A1 Oct. 2, 2025

(30) Foreign Application Priority Data

Mar. 28, 2024 (JP) ................................ 2024-054473

(51) Int. Cl.

| | |
|---|---|
| ***G05D 1/622*** | (2024.01) |
| ***G05D 1/248*** | (2024.01) |
| ***G05D 107/13*** | (2024.01) |
| ***G05D 109/10*** | (2024.01) |
| ***G05D 111/10*** | (2024.01) |

(52) U.S. Cl.

CPC ............. *G05D 1/622* (2024.01); *G05D 1/248* (2024.01); *G05D 2107/13* (2024.01); *G05D 2109/10* (2024.01); *G05D 2111/10* (2024.01)

(58) Field of Classification Search

CPC .... G05D 1/622; G05D 1/248; G05D 2107/13; G05D 2109/10; G05D 2111/10; G05D 1/2295; G05D 2105/24; G05D 2107/17; G05D 1/43; B60W 30/06; B60W 2754/20; B60W 2754/30; B60W 60/00; B60W 30/09

See application file for complete search history.

(56) References Cited

U.S. PATENT DOCUMENTS

| | | | |
|---|---|---|---|
| 9,481,368 | B2 | 11/2016 | Tomozawa et al. |
| 10,322,720 | B2 | 6/2019 | Ohmura et al. |

(Continued)

FOREIGN PATENT DOCUMENTS

| | | | |
|---|---|---|---|
| EP | 4318159 | A1 | 2/2024 |
| JP | 2016-060222 | A | 4/2016 |

(Continued)

OTHER PUBLICATIONS

Extended European Search Report for European Patent Application No. 25155908.4 dated Jul. 8, 2025.

*Primary Examiner* — Dale W Hilgendorf
*Assistant Examiner* — Frank T Glenn, III
(74) *Attorney, Agent, or Firm* — THOMAS | HORSTEMEYER, LLP

(57) ABSTRACT

The control device of a mobile body is configured to generate a route of the mobile body such that the mobile body avoids each of an actual obstacle and a virtual obstacle. The actual obstacle is an obstacle that is located around the mobile body and that is detected using a detection unit of the mobile body. The virtual obstacle is an obstacle virtually set in an entry prohibited area where entry of the mobile body is prohibited.

6 Claims, 5 Drawing Sheets

(56) References Cited

U.S. PATENT DOCUMENTS

| | | | |
|---|---|---|---|
| 10,967,876 | B2 | 4/2021 | Asakura et al. |
| 10,994,726 | B2 * | 5/2021 | Ohmura ................ B60W 30/09 |
| 2011/0282559 | A1 | 11/2011 | Isaji et al. |
| 2016/0224027 | A1 * | 8/2016 | Yamamoto ........... G05D 1/0212 |
| 2017/0217422 | A1 * | 8/2017 | Nakamura ............ B60W 10/20 |
| 2019/0389461 | A1 * | 12/2019 | Ohmura .............. B60W 30/146 |
| 2021/0370917 | A1 | 12/2021 | Ishinoda et al. |
| 2024/0045024 | A1 * | 2/2024 | Mishima ................. G01S 7/411 |
| 2024/0075954 | A1 | 3/2024 | Kuramitsu et al. |

FOREIGN PATENT DOCUMENTS

| | | | |
|---|---|---|---|
| JP | 2024-036933 | A | 3/2024 |
| WO | 2017/154152 | A1 | 9/2017 |
| WO | 2018/074541 | A1 | 4/2018 |

* cited by examiner

MOBILE BODY, CONTROL DEVICE AND CONTROL METHOD THEREFOR, AND STORAGE MEDIUM

CROSS-REFERENCE TO RELATED APPLICATION(S)

This application claims priority to and the benefit of Japanese Patent Application No. 2024-054473, filed Mar. 28, 2024, the entire disclosure of which is incorporated herein by reference.

BACKGROUND OF THE INVENTION

Field of the Invention

The present invention relates to a mobile body, a control device and a control method therefor, and a storage medium.

Description of the Related Art

In these years, there is an increasing demand for ultra-compact mobile bodies (micro mobility vehicles) for supporting movements of people in small regions. Micro mobility vehicles include vehicles each having a riding capacity of one person or so, vehicles that travel carrying baggage along with a person, instead of carrying passengers, and the like. Japanese Patent Laid-Open No. 2024-036933 describes generating a route of a mobile body such that the mobile body avoids an obstacle recognized based on an output of a detection unit. It is likely that a route passing through a region where the mobile body should not enter is generated only by avoiding the obstacle recognized based on the output of the detection unit.

SUMMARY OF THE INVENTION

Some aspects of the present invention provide a technique for appropriately generating a route of a mobile body. According to some embodiments, a control device of a mobile body is provided. The control device is configured to generate a route of the mobile body such that the mobile body avoids each of an actual obstacle and a virtual obstacle. The actual obstacle is an obstacle that is located around the mobile body and that is detected using a detection unit of the mobile body. The virtual obstacle is an obstacle virtually set in an entry prohibited area where entry of the mobile body is prohibited.

DESCRIPTION OF THE EMBODIMENTS

Figure 1A:
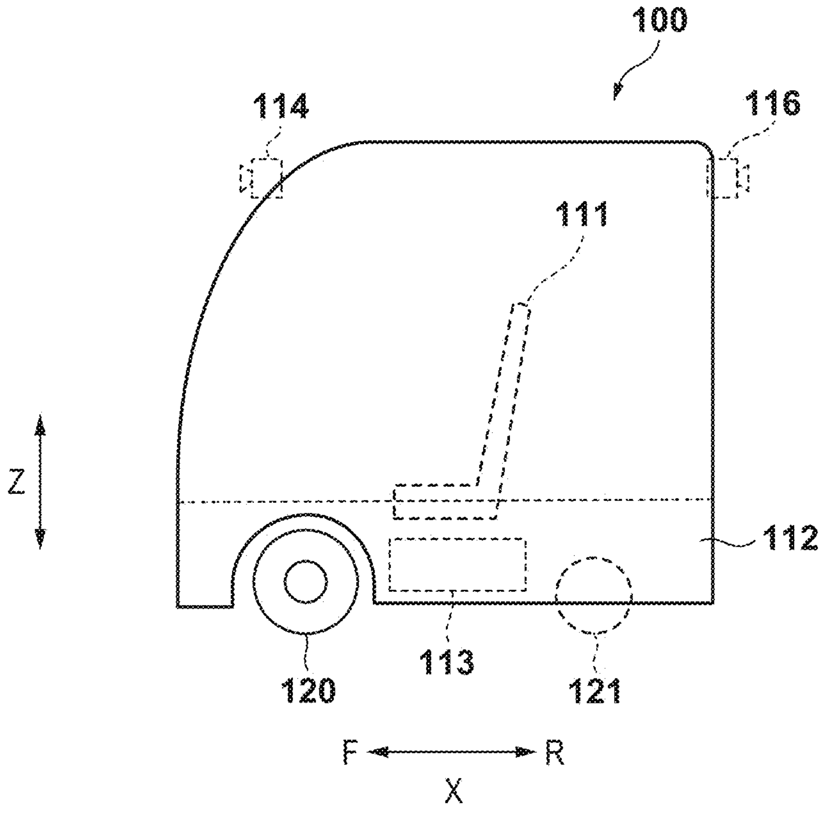
FIGS. 1A and 1B are schematic diagrams illustrating a configuration example of a mobile body according to some embodiments.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<Configuration of Mobile Body>

The configuration of a mobile body 100 will be described with reference to FIGS. 1A and 1B. In the following embodiment, an ultra-compact vehicle having a riding capacity of one person or so will be described as an example of the mobile body 100. Such vehicles may be referred to as micro mobility vehicles. The vehicle may be an electric vehicle or a vehicle that travels by another power. The mobile body 100 recognizes a traveling region and generates a route by using an image captured by the mobile body 100 itself, and autonomously travels in accordance with the generated route. Further, the mobile body 100 generates a route by using a positioning result obtained by a positioning sensor and map information. The mobile body 100 may be capable of autonomously traveling regardless of whether or not a person is on the mobile body 100. The mobile body 100 may be able to travel according to a driving operation performed by an occupant.

Figure 1B:
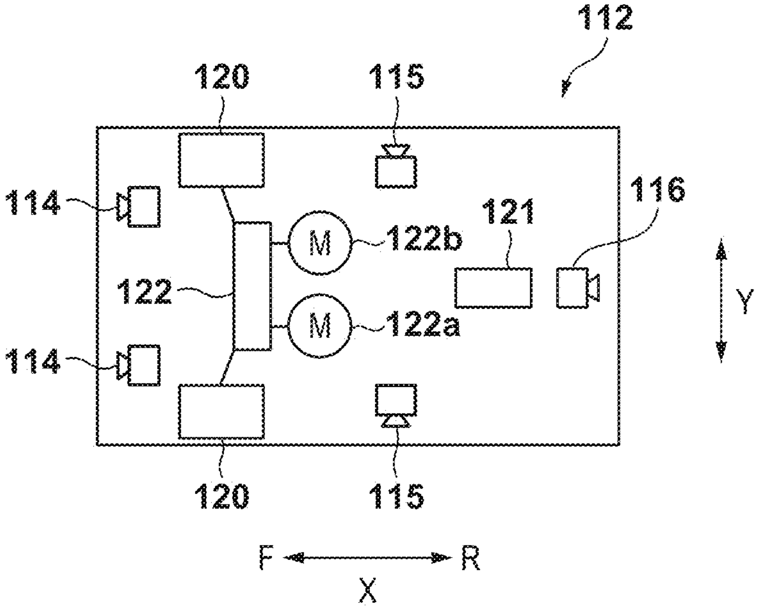

FIG. 1A illustrates a side view of the mobile body 100 according to the present embodiment, and FIG. 1B illustrates an internal configuration of the mobile body 100. In the drawing, an arrow X indicates a front-and-rear direction of the mobile body 100, in which F indicates the front, and R indicates the rear. Arrows Y and Z respectively indicate a width direction (horizontal direction) and a vertical direction of the mobile body 100.

The mobile body 100 is an electric autonomous vehicle including a traveling unit 112 and using a battery 113 as a main power supply. The battery 113 is, for example, a secondary battery such as a lithium ion battery, and the mobile body 100 autonomously travels by the traveling unit 112 with electric power supplied from the battery 113. The traveling unit 112 has a form of a three-wheeled vehicle including a pair of left and right drive wheels 120, which are front wheels, and one driven wheel 121 which is a rear wheel. Note that the traveling unit 112 may have another form such as a form of a four-wheeled vehicle. The mobile body 100 includes, for example, a one-person seat 111.

The traveling unit 112 includes a drive mechanism 122. The drive mechanism 122 is a mechanism that rotates the corresponding drive wheels 120 with motors 122*a* and 122*b* as drive sources. The drive mechanism 122 can move the mobile body 100 forward or backward by rotating each of the drive wheels 120. The drive mechanism 122 can also change the advancing direction of the mobile body 100 by generating a difference in rotation between the motors 122*a* and 122*b*. The traveling unit 112 includes the driven wheel 121. The driven wheel can rotate with the Z direction as a rotation axis.

The mobile body 100 includes detection units 114 to 116, each of which detects a target object around the mobile body

100. The detection units 114 to 116 are an external sensor group that monitors the periphery of the mobile body 100. In the present embodiment, each of the detection units 114 to 116 is an imaging device (camera) that captures an image of the periphery of the mobile body 100, and includes, for example, an optical system such as a lens and an image sensor. However, instead of or in addition to the imaging device, a radar or a light detection and ranging (LIDAR) can also be used.

For example, two detection units 114 are disposed on the front side of the mobile body 100 to be spaced apart from each other in the Y direction, and are mainly used for detecting a target object in front of the mobile body 100. The detection units 115 are disposed on the left and right sides of the mobile body 100, and are mainly used for detecting a target object in the lateral direction of the mobile body 100. The detection unit 116 is disposed on the rear side of the mobile body 100, and is mainly used for detecting a target object behind the mobile body 100.

Figure 2:
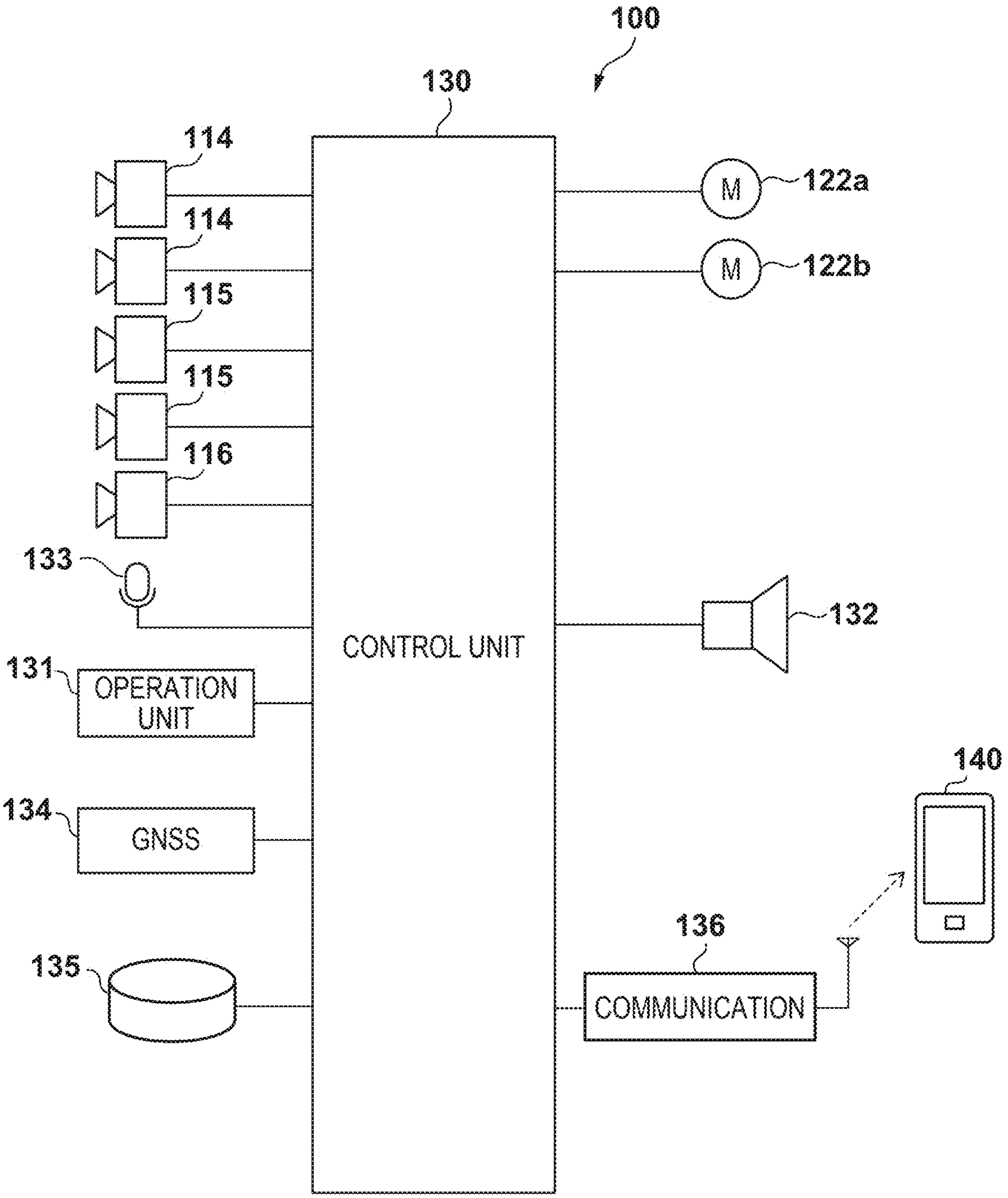
FIG. 2 is a block diagram illustrating a configuration example of a control system of the mobile body according to some embodiments.

FIG. 2 is a block diagram of a control system of the mobile body 100. The mobile body 100 includes a control unit (ECU) 130. The control unit 130 includes one or more processors represented by a CPU, a memory device such as a semiconductor memory, an interface with an external device, and the like. Thus, the control unit 130 is a kind of computer. The memory device stores programs to be executed by the processors, data to be used by the processors for processing, and the like. A plurality of sets of the processor, the memory device, and the interface may be provided for an individual function of the mobile body 100 to be capable of communicating with each other.

The control unit 130 acquires outputs (for example, image information) from the detection units 114 to 116, input information into an operation unit 131, voice information input from a voice input device 133, and the like, and performs corresponding processing. The control unit 130 performs control of the motors **122*a* and 122*b* (travel control of the traveling unit 112) and display control of a display panel included in the operation unit 131, gives a notification to an occupant of the mobile body 100 by sounds, and outputs information. The control unit 130 may perform processing using a machine learning model for image recognition (for example, a deep neural network) on the outputs from the detection units 114 to 116. In addition, the control unit 130 may perform processing using a machine learning model for voice recognition (for example, a deep neural network) on the outputs from the voice input device 133. In this manner, the control unit 130 controls the mobile body 100. Therefore, the control unit 130 may be regarded as a control device of the mobile body 100**.

The voice input device 133 includes, for example, a microphone, and collects voice of the occupant of the mobile body 100. The control unit 130 can recognize the input voice and perform processing corresponding to the recognized input voice. A global navigation satellite system (GNSS) sensor 134 is a positioning sensor that receives a GNSS signal and detects a current position of the mobile body 100.

A storage device 135 includes a recording medium that stores various types of data. The storage device 135 may also store programs to be executed by the processors, data to be used by the processors for processing, and the like. The storage device 135 may store various parameters (for example, trained parameters of a deep neural network, hyperparameters, and the like) of a machine learning model for voice recognition or image recognition to be executed by the control unit 130. The storage device 135 may store map information regarding a place where the mobile body 100 travels.

A communication device 136 is a communication device capable of communicating with an external device (for example, a communication terminal 140 owned by a user) via wireless communication, such as Wi-Fi (registered trademark) or 5th generation mobile communication.

Figure 3:
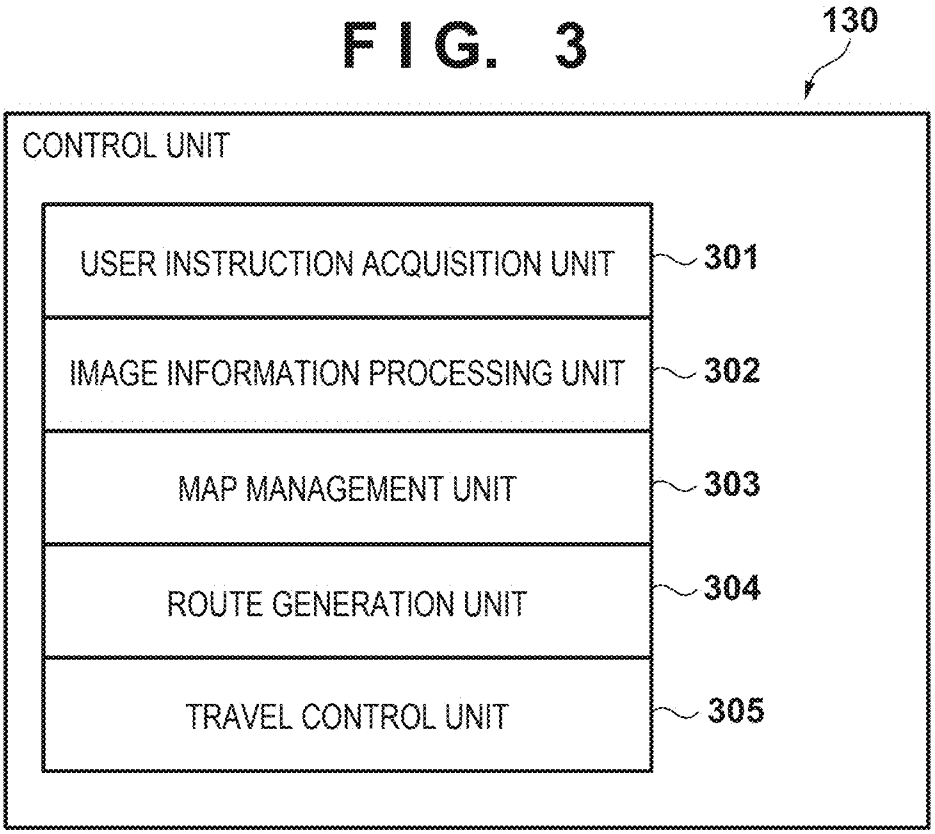
FIG. 3 is a block diagram illustrating a functional configuration example related to a control unit of the mobile body according to some embodiments.

Next, a functional configuration example of the control unit 130 will be described with reference to FIG. 3. A user instruction acquiring unit 301 acquires a user instruction input via the operation unit 131 or the voice input device 133. The user instruction may include designation of a destination at which the mobile body 100 should arrive. The destination may be a position of a target object designated by an utterance voice among target objects recognized in images output from the detection units 114 to 116. Further, the destination may be a geographical position designated by a user who uses the mobile body 100, or a geographical position preset by an administrator of the mobile body 100 and stored in the storage device 135. For example, the mobile body 100 may be set to autonomously return to a preset geographical position after being used by the user.

An image information processing unit 302 recognizes positions, shapes, and the like of an obstacle based on the outputs (for example, image information) from the detection units 114 to 116. The positions, shapes, and the like of the obstacle in front of the mobile body 100 are recognized, for example, by obtaining a distance from the mobile body 100 using a stereo image obtained from the two detection units 114. In order to recognize the obstacle, a machine learning model (for example, a deep neural network) for image recognition trained in advance may be used for a monocular image or a stereo image. The obstacle may be any target object that hinders traveling of the mobile body 100, and it may be a stationary target object or a moving target object. For example, the obstacle may include a person, a pet, a tree, a wall, a step, a door, a vehicle, a shopping cart, an area marked with a no-entry sign, and the like.

The map management unit 303 manages a map of an environment where the mobile body 100 is used. An entry prohibited area may be set in the map. The entry prohibited area refers to a geographical area where entry of the mobile body 100 is prohibited. The administrator or the user of the mobile body 100 may set the geographical position of the entry prohibited area. The map may be stored in the storage device 135 of the mobile body 100. The map management unit 303 may receive a map from an external server and store the map in the storage device 135.

A route generation unit 304 generates a route along which the mobile body 100 should travel. For example, when there is no obstacle in the straight forward direction from the current position to the destination, the route generation unit 304 generates a route along the straight forward direction. When there is an obstacle in the straight forward direction from the current position toward the destination, the route generation unit 304 generates a route such that the mobile body approaches the destination while avoiding the obstacle. The route generation unit 304 may generate a route such that the angular acceleration of the mobile body 100 is equal to or less than a threshold. The detail of generating a route will be described later.

A travel control unit 305 controls the mobile body 100 so that the mobile body 100 autonomously moves in accordance with the route that has been generated by the route generation unit 304. When the mobile body 100 is a vehicle, the movement of the mobile body 100 can be expressed as traveling of the mobile body 100. When the mobile body 100 is a flight object, the movement of the mobile body 100 can be expressed as flight of the mobile body 100. When receiving an instruction such as right turn, left turn, or stop from the user while the mobile body 100 is traveling, the travel control unit 305 may control the mobile body 100 so that the mobile body 100 travels according to the instruction.

Figure 4A:
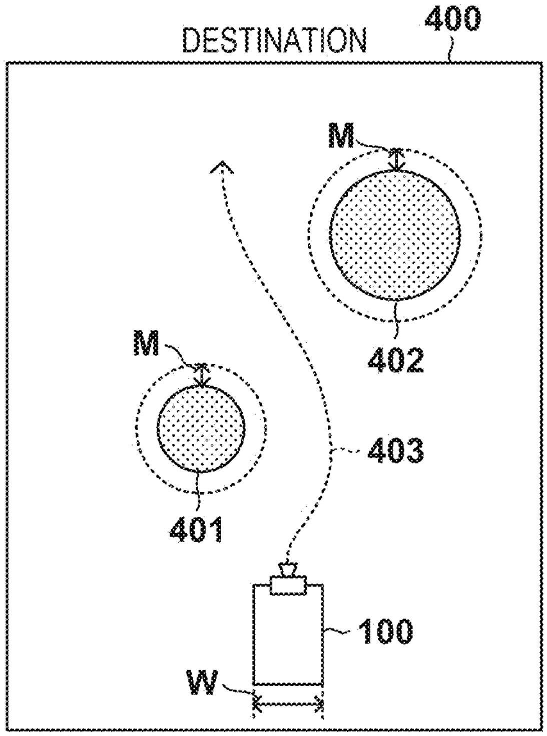
FIGS. 4A and 4B are schematic diagrams for describing an example of a method for generating a route according to some embodiments.

A specific example of a route generation method by the route generation unit 304 will be described with reference to FIGS. 4A and 4B. FIG. 4A is a plan view of an example of an actual environment 400 in which the mobile body 100 is located. There are obstacles 401 and 402 around the mobile body 100 in the actual environment 400. In FIG. 4A and subsequent drawings, the shape of the obstacle is represented by a circle for ease of description. Alternatively, the obstacle may have any shape. In FIG. 4A and subsequent drawings, it is assumed that the upper side of the drawing indicates a region in front of the vehicle. In the example of FIG. 4A, it is assumed that the destination is on the upper side of the drawing and the mobile body 100 is autonomously traveling toward the destination. At this time, a person may be or may not be on the mobile body 100.

The route generation unit 304 generates a route 403 such that the mobile body 100 avoids the obstacles 401 and 402 while approaching the destination as the route along which the mobile body 100 should travel. Since the obstacle can be a human, there is a possibility that the human feels uneasy when the mobile body 100 travels close to the obstacle. Furthermore, in a case where an occupant is on the mobile body 100, the occupant may feel uneasy as the mobile body 100 travels close to the obstacle. In view of this, a margin M to be ensured between the mobile body 100 and the obstacle may be set in the mobile body 100. In this case, the mobile body 100 generates a route such that the distance between the obstacle and the mobile body 100 is larger than the margin M. The value of the margin M may be determined in advance and stored in the control unit 130 or the storage device 135. The margin M is set to a value by which a human feels safe about the traveling of the mobile body 100, and may be, for example, 0.3 m to 1.0 m, specifically 0.6 m. In the example of the actual environment 400, the distance between each of the obstacles 401 and 402 and the mobile body 100 is larger than the margin M, even if the mobile body 100 passing between the obstacle 401 and the obstacle 402 travels. Therefore, the route generation unit 304 generates a route 403 such that the mobile body 100 travels between the obstacle 401 and the obstacle 402. In some embodiments, the margin M may not be set, and in this case, the mobile body 100 is allowed to travel close to the obstacle.

Figure 4B:
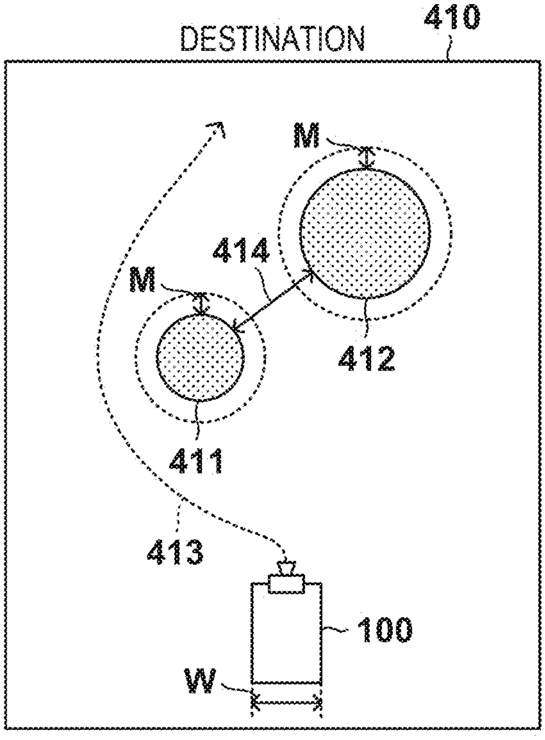

FIG. 4B is a plan view of another example of an actual environment 410 in which the mobile body 100 is located. There are obstacles 411 and 412 around the mobile body 100 in the actual environment 410. In the example of FIG. 4B, the destination is also on the upper side of the drawing. In this example, a distance 414 between the obstacle 411 and the obstacle 412 is smaller than the sum of the value twice the margin M and the width W of the mobile body 100. Therefore, the mobile body 100 cannot travel between the obstacle 411 and the obstacle 412 while ensuring the margin M. Therefore, the route generation unit 304 generates a route 413 such that the mobile body 100 does not travel between the obstacle 401 and the obstacle 402 and bypasses the obstacle 411 from the left side.

Figure 5A:
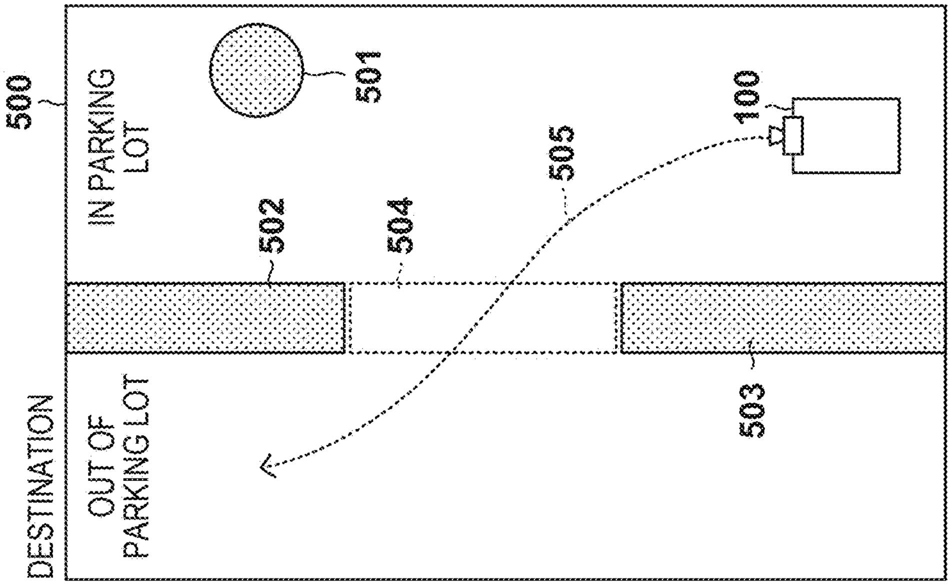
FIGS. 5A to 5C are schematic diagrams for describing an example of a method for generating a route according to some embodiments.

Next, a route generation method in a case where an entry prohibited area is set will be described with reference to FIGS. 5A to 5C. FIG. 5A is a plan view illustrating an example of an actual environment 500 in which the mobile body 100 is located. It is assumed that the right part of the actual environment 500 is an area within a parking lot and the left part of the actual environment 500 is an area outside the parking lot. Currently, the mobile body 100 is located in the parking lot. There are obstacles 501 to 503 around the mobile body 100 in the actual environment 500. The obstacle 501 is, for example, a pedestrian or a vehicle. The obstacles 502 and 503 are structures that define the outer edge of the parking lot, and are, for example, walls, fences, steps, curbstone blocks, partition lines, and the like. An exit 504 of the parking lot is located between the obstacle 502 and the obstacle 503. The exit 504 may also be used as an entrance of the parking lot. It is assumed that the destination of the mobile body 100 is in the upper left direction in FIG. 5A. In this case, the route generation unit 304 generates a route 505 such that the mobile body 100 approaches the destination while avoiding the obstacles 501 to 503. Since there is no obstacle at the exit 504 of the parking lot, the route 505 extends to the outside of the parking lot.

Figure 5B:
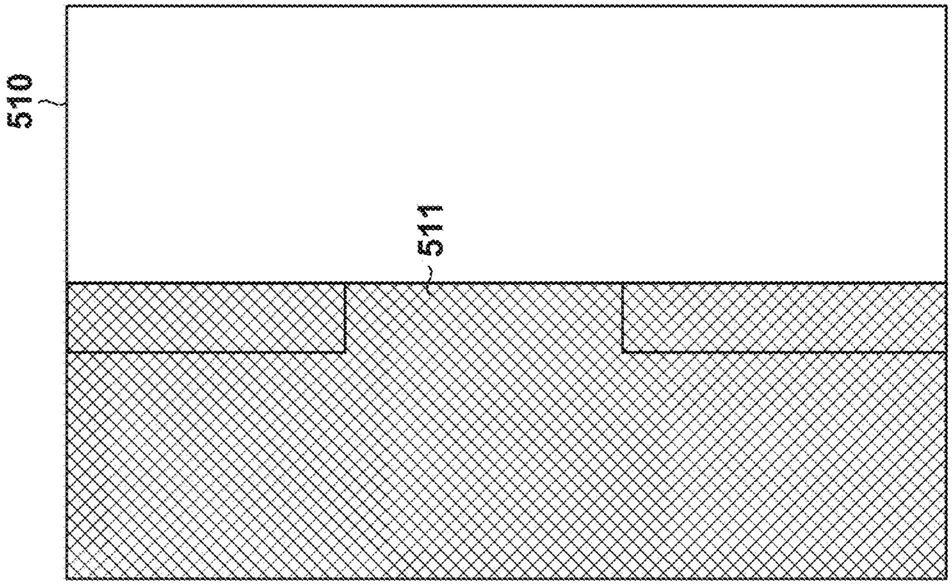
Figure 5C:
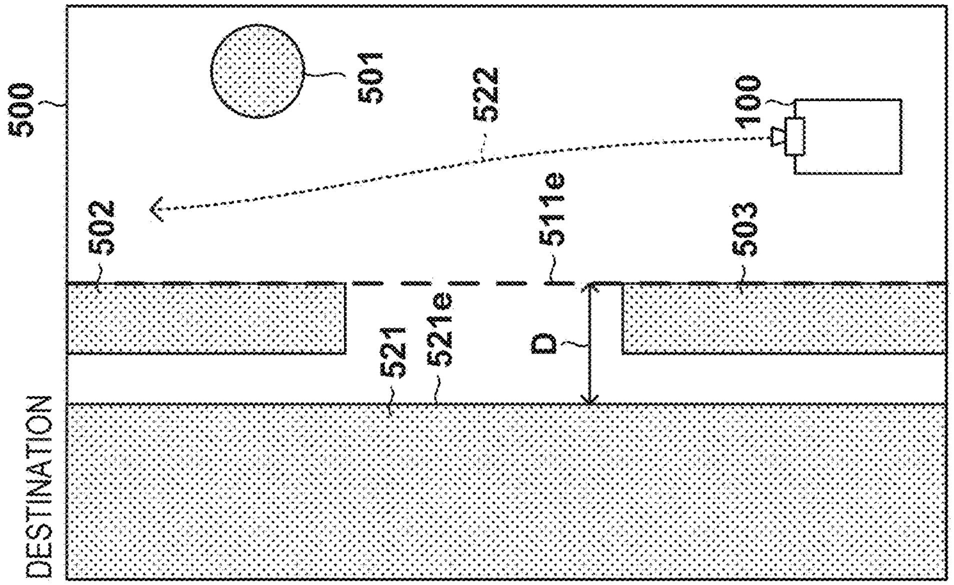

In a case where the administrator or the user of the mobile body 100 desires to prohibit the mobile body 100 from going out of the parking lot, the administrator or the user may set an entry prohibited area 511 on the map 510 used by the mobile body 100 as illustrated in FIG. 5B. The entry prohibited area 511 is defined as a geographical position. The map 510 is managed by, for example, the map management unit 303.

Setting of a virtual obstacle 521 will be described with reference to FIG. 5C. The route generation unit 304 sets the virtual obstacle 521 in the entry prohibited area 511 so as not to generate a route along which the mobile body 100 passes through the entry prohibited area 511. FIG. 5C illustrates a state in which the virtual obstacle 521 is set in the actual environment 500. Hereinafter, the obstacle (for example, obstacles 501 to 503) detected by the detection units 114 to 116 are referred to as an actual obstacle. The route generation unit 304 generates a route 522 of the mobile body 100 such that the mobile body 100 avoids each of the actual obstacle and the virtual obstacle 521. This prevents the mobile body 100 from entering the entry prohibited area 511.

Setting the virtual obstacle 521 in the entry prohibited area 511 may include setting the virtual obstacle 521 such that the area in which the virtual obstacle 521 is set at least partially overlaps with the entry prohibited area 511. The route generation unit 304 may set the virtual obstacle 521 such that an outer edge 511*e* of the entry prohibited area 511 and an outer edge 521*e* of the virtual obstacle 521 coincide with each other. Alternatively, as illustrated in FIG. 5C, the route generation unit 304 may set the virtual obstacle 521 such that the outer edge 521*e* of the virtual obstacle 521 is located inside the entry prohibited area 511. Even when the virtual obstacle 521 is set in this manner, the route 522 is determined to prevent the mobile body 100 from entering the entry prohibited area 511 by cooperation between the actual obstacle (specifically, obstacles 502 and 503) and the virtual obstacle 521.

In order to simplify the processing, the route generation unit 304 may generate a route by treating the actual obstacle and the virtual obstacle 521 in the same manner. For example, when a margin M to be ensured between the mobile body 100 and the actual obstacle is set, the route generation unit 304 may also ensure the margin M between the mobile body 100 and the virtual obstacle 521. In this case, the route generation unit 304 generates a route 522 of the mobile body 100 such that the distance between the mobile body 100 and each of the actual obstacle and the virtual obstacle 521 is larger than the margin M.

As illustrated in FIGS. 5A and 5B, the entry prohibited area 511 is set to cover the exit 504 of the parking lot. When the virtual obstacle is disposed so as to overlap the exit 504, the route generation unit 304 generates a route such that the mobile body 100 does not approach an area within the margin M from the exit 504. However, there is no actual obstacle at the exit 504, and thus, even if the mobile body 100 approaches the exit 504, there is a low possibility that the occupant of the mobile body 100 or surrounding people feel uneasy. Therefore, the virtual obstacle 521 is set such that the outer edge 521*e* of the virtual obstacle 521 is located inside the entry prohibited area 511 as illustrated in FIG. 5C, whereby an excessive limitation of the region in which the mobile body 100 can travel is suppressed.

The route generation unit 304 may set the virtual obstacle 521 such that the distance D between the outer edge 511*e* of the entry prohibited area 511 and the outer edge 521*e* of the virtual obstacle 521 is smaller than the sum of the value twice the margin M and the width W of the mobile body 100. As a result, similar to the description for FIG. 4B, the route generation unit 304 does not generate a route along which the mobile body 100 passes between the virtual obstacle 521 and the obstacles 502 and 503, and thus, the entry of the mobile body 100 into the entry prohibited area 511 can be prevented.

The route generation unit 304 determines the positional relationship between the mobile body 100 and the actual obstacle based on the outputs from the detection units 114 to 116. On the other hand, the route generation unit 304 specifies the position of the virtual obstacle 521 with respect to the mobile body 100 based on the relationship between the geographical position of the mobile body 100 measured by the positioning sensor (for example, GNSS sensor 134) of the mobile body 100 and the geographical position of the virtual obstacle 521 set in the entry prohibited area 511. The positioning sensor may have an error. Therefore, there is a possibility that the virtual obstacle 521 is identified to be shifted by a maximum of nominal error of the positioning sensor with respect to the actual obstacle (for example, obstacles 501 to 503) and the mobile body 100 located in the actual environment 500.

If the distance D between the outer edge 511*e* of the entry prohibited area 511 and the outer edge 521*e* of the virtual obstacle 521 is too small, the virtual obstacle 521 may be set to protrude outside the entry prohibited area 511 as a result of an error of the positioning sensor. In this case, the region in which the mobile body 100 can travel may be excessively limited. In view of this, the route generation unit 304 may set the virtual obstacle 521 such that the distance D between the outer edge 511*e* of the entry prohibited area 511 and the outer edge 521*e* of the virtual obstacle 521 is greater than the nominal error E of the GNSS sensor 134.

On the other hand, if the distance D between the outer edge 511*e* of the entry prohibited area 511 and the outer edge 521*e* of the virtual obstacle 521 is too large, the distance between the virtual obstacle 521 and the actual obstacle (for example, obstacles 502 and 503) increases as a result of an error of the positioning sensor. In this case, a route in which the mobile body 100 passes between the virtual obstacle 521 and the actual obstacle may be generated. Therefore, the route generation unit 304 may set the virtual obstacle 521 such that the distance D between the outer edge 511*e* of the entry prohibited area 511 and the outer edge 521*e* of the virtual obstacle 521 is smaller than the value obtained by subtracting the nominal error E of the GNSS sensor 134 from the sum of the value twice the margin M and the width W of the mobile body 100.

When the margin Mis 0.6 m, the nominal error E of the GNSS sensor 134 is 0.6 m, and the width W of the mobile body 100 is 1.3 m, the route generation unit 304 may set the virtual obstacle 521 such that the distance D between the outer edge 511*e* of the entry prohibited area 511 and the outer edge 521*e* of the virtual obstacle 521 is, for example, 1.0 m. In this setting example, the distance D (1.0 m) is larger than the nominal error E (0.6 m). Furthermore, the distance D (1.0 m) is smaller than a value (1.9 m) obtained by subtracting the nominal error E (0.6 m) of the GNSS sensor 134 from the sum of the value twice the margin M (0.6 m) and the width W (1.3 m) of the mobile body 100.

By generating the route of the mobile body 100 as described above, it is possible to generate an appropriate route that prevents the mobile body 100 from entering the entry prohibited area 511 while using the conventional route generation process for actual obstacles.

Figure 6:
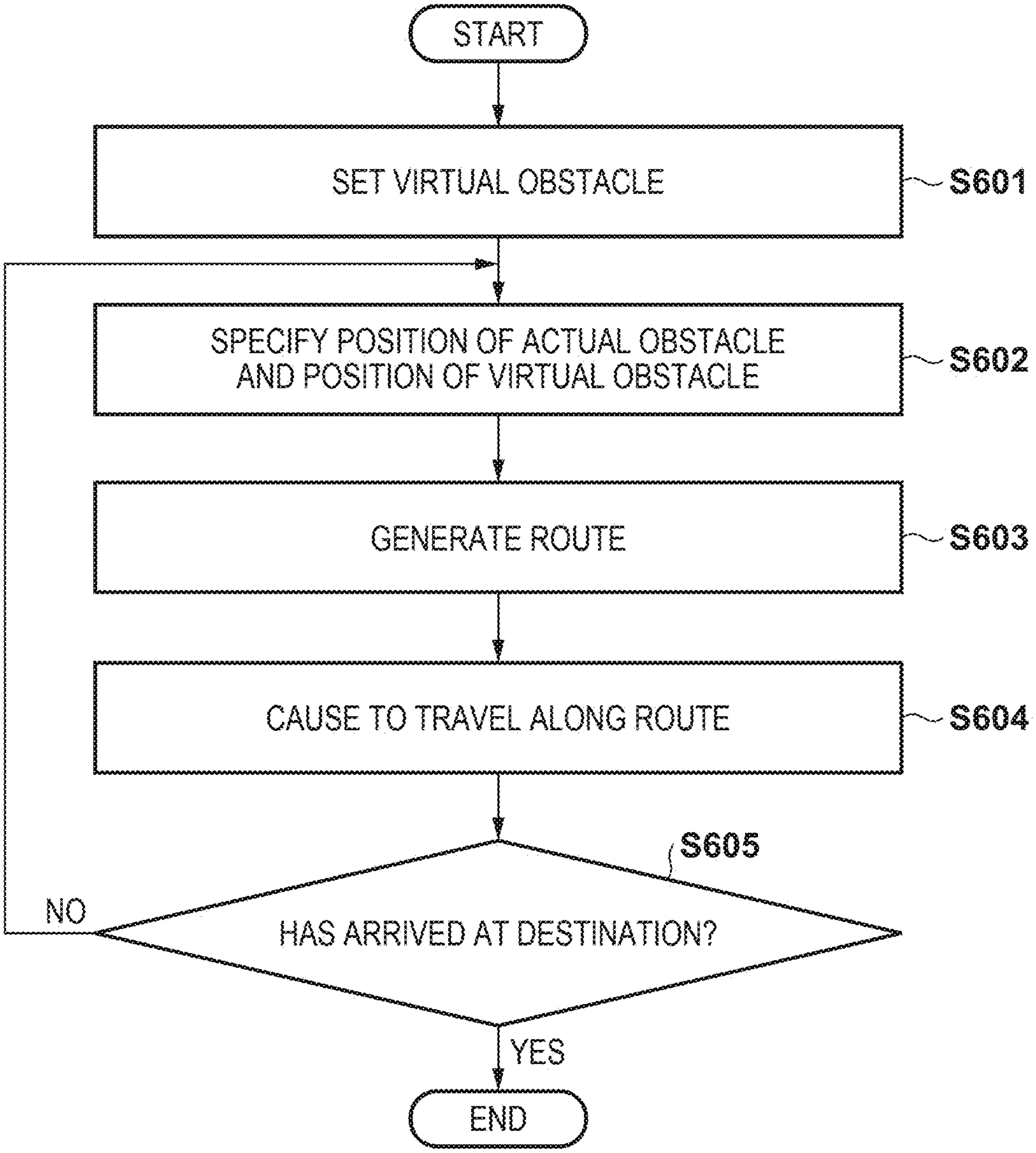
FIG. 6 is a flowchart for describing an example of a method for controlling the mobile body according to some embodiments.

Next, an example of a method for controlling the mobile body 100 will be described with reference to FIG. 6. The method of FIG. 6 may be executed in response to an instruction to start autonomous traveling of the mobile body 100. The autonomous traveling of the mobile body 100 may be started, for example, in response to an instruction from an occupant of the mobile body 100, in response to the lapse of a predetermined time after the end of use by the user, in response to the mobile body 100 receiving an instruction from an external server, or when other conditions are satisfied. It is assumed that the destination of the mobile body 100 is set when the method of FIG. 6 is started. In addition, it is assumed that the mobile body 100 stores a map in which the entry prohibited area 511 is set at the start of the method of FIG. 6. Each step in the method of FIG. 6 may be performed by a CPU of the control unit 130 executing a program read in a memory of the control unit 130. Alternatively, a part or all of the steps of the method of FIG. 6 may be executed by a dedicated circuit such as an application-specific integrated circuit (ASIC).

In S601, the control unit 130 (for example, the route generation unit 304) sets the virtual obstacle 521 in the entry prohibited area 511 as described above. Alternatively, a device different from the mobile body 100 may set the virtual obstacle 521 in the entry prohibited area 511, and the mobile body 100 may acquire the setting (that is, the geographical position) of the virtual obstacle 521 from this device.

In S602, the control unit 130 (for example, the route generation unit 304) specifies the position of an actual obstacle and the position of a virtual obstacle with respect to the mobile body 100. For example, the control unit 130 (for example, the image information processing unit 302) uses the detection units 114 to 116 of the mobile body 100 to detect an actual obstacle (for example, obstacles 501 to 503) located around the mobile body 100 as described above. The control unit 130 (for example, the route generation unit 304) specifies the position of the actual obstacle with respect to the mobile body 100 based on the detection result. In addition, the control unit 130 (for example, the route generation unit 304) specifies the position of the actual obstacle with respect to the mobile body 100 based on the detection result. The control unit 130 (for example, the route generation unit 304) specifies the position of the virtual obstacle with respect to the mobile body 100 based on the relationship between the measurement result (that is, the geographical position of the mobile body 100) measured by the GNSS sensor 134 and the geographical position of the virtual obstacle set in S601.

In S603, the control unit 130 (for example, the route generation unit 304) generates the route of the mobile body 100 such that the mobile body 100 approaches the destination and avoids each of the actual obstacle detected in S602 and the virtual obstacle set in S601 as described above. In S604, the control unit 130 (for example, the travel control unit 305) causes the mobile body 100 to travel according to the route generated in S604 as described above.

In S605, the control unit 130 (for example, the travel control unit 305) determines whether or not the mobile body 100 has arrived at the destination. When it is determined that the mobile body 100 has arrived at the destination ("YES" in S605), the control unit 130 ends the processing, otherwise ("NO" in S605) the processing proceeds to S602. Thereafter, the control unit 130 repeats S602 to S605. As the mobile body 100 travels, the position of the actual obstacle changes, or a new actual obstacle can be detected by the detection units 114 to 116. In response to this, the control unit 130 newly generates a route in S603, and causes the mobile body 100 to travel along the new route.

In FIG. 6, a method for autonomously moving the mobile body 100 has been described. Alternatively, the mobile body 100 may present the route generated in S604 to the occupant of the mobile body 100 instead of executing S604. The occupant of the mobile body 100 may drive the mobile body 100 by himself/herself with reference to the presented route.

Summary of Embodiment

[Item 1]

A control device (130) of a mobile body (100), the control device configured to generate a route (522) of the mobile body such that the mobile body avoids each of an actual obstacle (501-503) and a virtual obstacle (521), wherein the actual obstacle is an obstacle that is located around the mobile body and that is detected using a detection unit (114-116) of the mobile body, and the virtual obstacle is an obstacle virtually set in an entry prohibited area (511) where entry of the mobile body is prohibited.

According to this item, the route of the mobile body can be appropriately generated so as to prevent the mobile body from entering the entry prohibited area.

[Item 2]

The control device according to Item 1, wherein the virtual obstacle is set such that an outer edge (521*e*) of the virtual obstacle is located inside the entry prohibited area.

According to this item, the route of the mobile body can be appropriately generated so as to prevent excessive limitation of a region where the mobile body can travel.

[Item 3]

The control device according to Item 2, configured to generate the route of the mobile body such that a distance between the mobile body and each of the actual obstacle and the virtual obstacle is larger than a predetermined margin (M).

According to this item, the route of the mobile body can be appropriately generated so as not to give anxiety to the occupant of the mobile body or surrounding people.

[Item 4]

The control device according to Item 3, wherein the virtual obstacle is set such that a distance (D) between an outer edge (511*e*) of the entry prohibited area and the outer edge (521*e*) of the virtual obstacle is smaller than a sum of a width (W) of the mobile body and a value twice the predetermined margin.

According to this item, the route of the mobile body can be appropriately generated so as to prevent the mobile body from entering the entry prohibited area by cooperation between the actual obstacle and the virtual obstacle.

[Item 5]

The control device according to Item 3 or 4, wherein the entry prohibited area is defined by a geographical position, the control device is configured to specify a position of the virtual obstacle with respect to the mobile body based on a relationship between a geographical position of the mobile body measured by a positioning sensor (134) of the mobile body and a geographical position of the virtual obstacle, and the virtual obstacle is set such that a distance between an outer edge of the entry prohibited area and the outer edge of the virtual obstacle is larger than a nominal error of the positioning sensor.

According to this item, the route of the mobile body can be appropriately generated so as to prevent excessive limitation of a region where the mobile body can travel even when the positioning result includes an error.

[Item 6]

The control device according to Item 5, wherein the virtual obstacle is set such that the distance between the outer edge of the entry prohibited area and the outer edge of the virtual obstacle is smaller than a value obtained by subtracting the nominal error of the positioning sensor from a sum of a width of the mobile body and a value twice the predetermined margin.

According to this item, even when the positioning result includes an error, the route of the mobile body can be appropriately generated so as to prevent the mobile body from entering the entry prohibited area by cooperation between the actual obstacle and the virtual obstacle.

[Item 7]

A mobile body comprising the control device according to any one of Items 1-6.

According to this item, a mobile body including the above-described control device can be provided.

[Item 8]

A program for causing a computer to function as the control device according to any one of Items 1-6.

According to this item, a program capable of implementing the control device can be provided.

[Item 9]

A method for controlling a mobile body (100), the method comprising generating (S603) a route (522) of the mobile body such that the mobile body avoids each of an actual obstacle (501-503) and a virtual obstacle (521), wherein the actual obstacle is an obstacle that is located around the mobile body and that is detected using a detection unit (114-116) of the mobile body, and the virtual obstacle is an obstacle virtually set in an entry prohibited area (511) where entry of the mobile body is prohibited.

According to this item, the route of the mobile body can be appropriately generated so as to prevent the mobile body from entering the entry prohibited area.

The invention is not limited to the foregoing embodiments, and various variations/changes are possible within the spirit of the invention.

What is claimed is:

1. A control device of a mobile body, the control device configured to generate a route of the mobile body such that the mobile body avoids each of an actual obstacle and a virtual obstacle, and control the mobile body to autonomously move in accordance with the route that has been generated, wherein the actual obstacle is an obstacle that is located around the mobile body and that is detected using a detection unit of the mobile body, the virtual obstacle is an obstacle virtually set in an entry prohibited area where entry of the mobile body is prohibited, such that an outer edge of the virtual obstacle is located inside the entry prohibited area and a distance between an outer edge of the entry prohibited area and the outer edge of the virtual obstacle is smaller than a sum of a width of the mobile body and a value twice a predetermined margin, and the route of the mobile body is generated such that a distance between the mobile body and each of the actual obstacle and the virtual obstacle is larger than the predetermined margin.

2. The control device according to claim 1, wherein the entry prohibited area is defined by a geographical position, the control device is configured to specify a position of the virtual obstacle with respect to the mobile body based on a relationship between a geographical position of the mobile body measured by a positioning sensor of the mobile body and a geographical position of the virtual obstacle, and the virtual obstacle is set such that a distance between an outer edge of the entry prohibited area and the outer edge of the virtual obstacle is larger than a nominal error of the positioning sensor.

3. The control device according to claim 2, wherein the virtual obstacle is set such that the distance between the outer edge of the entry prohibited area and the outer edge of the virtual obstacle is smaller than a value obtained by subtracting the nominal error of the positioning sensor from a sum of a width of the mobile body and a value twice the predetermined margin.

4. The mobile body comprising the control device according to claim 1.

5. A semiconductor memory storing a program for causing a computer to function as the control device according to claim 1.

6. A method for controlling a mobile body, the method comprising generating a route of the mobile body such that the mobile body avoids each of an actual obstacle and a virtual obstacle, and controlling the mobile body to autonomously move in accordance with the route that has been generated, wherein the actual obstacle is an obstacle that is located around the mobile body and that is detected using a detection unit of the mobile body, the virtual obstacle is an obstacle virtually set in an entry prohibited area where entry of the mobile body is prohibited, such that an outer edge of the virtual obstacle is located inside the entry prohibited area and a distance between an outer edge of the entry prohibited area and the outer edge of the virtual obstacle is smaller than a sum of a width of the mobile body and a value twice a predetermined margin, and the route of the mobile body is generated such that a distance between the mobile body and each of the actual obstacle and the virtual obstacle is larger than the predetermined margin.

* * * * *